Feb. 16, 1932.                O. SCHMIDT                1,845,523
                          PRECISION QUICK BALANCE
                           Filed Nov. 30, 1929
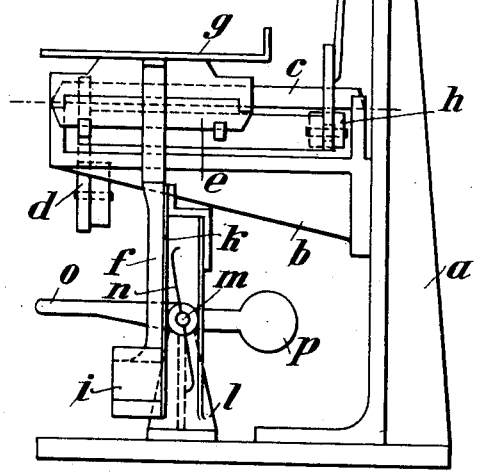
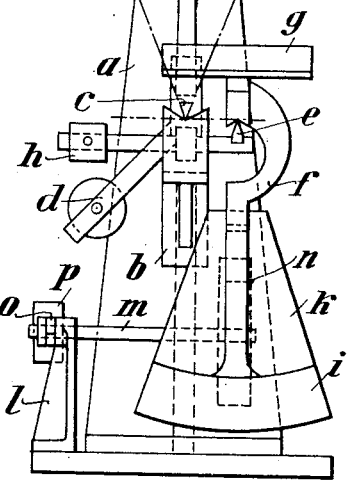
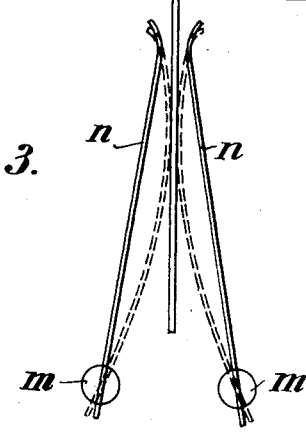
INVENTOR:
Otto Schmidt
BY: Runge, Boyer & Bachelor
                 ATTORNEYS.

Patented Feb. 16, 1932

1,845,523

UNITED STATES PATENT OFFICE

OTTO SCHMIDT, OF BERLIN-TEGEL, GERMANY

PRECISION QUICK BALANCE

Application filed November 30, 1929, Serial No. 410,692, and in Germany December 3, 1928.

The invention relates to a top pan quick balance serving for the weighing of very small loads down to fractions of grammes, without the use of weights, which have hitherto been found tedious and troublesome in the case of beam balances used for fine weighing.

The balance is constructed on the principle of the well known automatic balance but with the differences representing the essence of the invention, which are characterized by the provision of a scale pan pendulum supported directly in the wide knife edge bearing of the indicator pendulum, in order to give by means of such a top pan arrangement a more convenient use of the balance than with a suspended pan.

The invention is further characterized by the provision of a device for damping or arresting the oscillations of both the indicator pendulum and the pan pendulum, which arresting device releases the pendulums after the damping of the oscillations has taken place, so that said pendulums are free from all contact whatever with any stationary part of the machine. By this construction the use of indicator balances is made possible for precision weighing, for which purpose the well known air and oil cylinder arresters are totally unsuited.

In the accompanying drawings,

Fig. 1 is a side view of a balance embodying the features of the present invention;

Fig. 2 is a front view thereof; and

Fig. 3 is a diagrammatic side view illustrating a modified form of the arresting device.

To an upright $a$ is fixed a pan bracket $b$ which takes, on a wide bearing, the knife edge axis $c$ of the pendulum $d$. The knife edge $e$ is fixed on the pendulum $d$ and in the ends thereof is suspended by means of bushes a scale pan pendulum $f$. The knife edge for the scale pan has approximately the length of the load field of the scale pan carried thereon. Its points of application, however, do not need to be formed by the ends of a correspondingly long knife edge, but the indicator pendulum may carry in place thereof two short knife edges at a suitable distance apart.

$h$ is a compensating weight for the scale pan pendulum on a special arm of the indicator pendulum. The scale pan pendulum carries the load weight $i$ which corresponds in its size to the weighing range of the balance in such manner that on placing the highest load on the left hand or right hand edge of the scale pan, the latter can only effect a slight inclination in the plane of oscillation still possible thereto, so that the load when placed at the side cannot slide off.

The loading of the oscillatory scale pan with its counter weight plays no part in the fineness of the play of the balance as it is always in proportion to the weighing range of the balance. The arrangement permits, on the other hand, however, a top pan balance as a pure indicator balance, and renders superfluous any transmission lever mechanism, such as the generally known quick balances combined with an indicator balance require, the latter not being capable of use as fine balances in the sense of the present balance.

To the scale pan stabilizing pendulum $f$ are fastened, in the example of construction shown in Figs. 1 and 2, two oppositely situated arresting plates $kk$, between which is arranged a spindle $m$ or the like rotatably carried in a bearing bracket $l$, the free end of the spindle carrying in the centre between the arresting plates an approximately S-shaped, very fine spring band $n$, which on pressing down the lever $o$ fixed on the spindle $m$ is pressed with both ends uniformly each against an arresting plate, causing the damping of the oscillations of the scale pan pendulum $f$ as well as of the indicator pendulum $d$.

The hand lever $o$ is suitably provided with a counter weight $p$ in order, on the termination of the arresting process, to again swing away the fine steel band or the like from the arresting surfaces of the plates $kk$ and to again completely release the balance.

Fig. 3 shows diagrammatically a modified form of the arresting device, in which two spring bands $n'$ are shown associated with a single scale controlled plate $k'$, the dotted position of the elastic arresting bodies representing the most powerful arresting pressure. The powerful commencing pressure of the arresting bodies first moderates the early strong oscillations of the pendulum, and then as they gradually lessen, the finest oscillations until the complete deflection and the release of the balance from the influence thereon by the arrester.

The damping of the oscillations above described may be accomplished by means other than the application of elastic arresting members, without departing from the spirit and scope of the invention.

Patent claims:

1. A precision balance, comprising in combination, a pivoted indicated device, a pendulum for swinging said device on its pivot, a scale pan disposed above said pendulum and pivotally supported thereon, a stabilizing pendulum carried by said scale pan, elastic means operable to dampen the oscillations of both of said pendulums, and means operative after actuation of said elastic means to return the same to inoperative position.

2. A precision balance, comprising in combination, a pivoted indicating device, a pendulum for swinging said device on its pivot, a scale pan disposed above said pendulum and pivotally supported thereon, a stabilizing pendulum carried by said scale pan, elastic means manually operable to dampen the oscillations of both of said pendulums, and means automatically operable after actuation of said elastic means to return the same to inoperative position.

3. A precision balance, comprising in combination, a pivoted indicating device, a pendulum for swinging said device on its pivot, a scale pan disposed above said pendulum and pivotally supported thereon, a stabilizing pendulum depending from said scale pan, an arresting plate carried by said stabilizing pendulum, elastic means disposed adjacent to said plate, means for moving said elastic means into contact with said plate thereby to dampen the oscillations of both of said pendulums, and means operative after actuation of said elastic means to return the same to inoperative position.

4. A precision balance, comprising in combination, a pivoted indicating device, a pendulum for swinging said device on its pivot, a scale pan disposed above said pendulum and pivotally supported thereon, a stabilizing pendulum depending from said scale pan, a pair of arresting plates carried by said stabilizing pendulum, a movable member disposed between said plates and having a pair of elastic members disposed adjacent to said plates, manually operable means for moving said member to carry said elastic members into contact respectively with said plates, and automatically operable means for returning said movable member to its initial position thereby to carry said elastic members out of contact with said plates.

OTTO SCHMIDT.